Sept. 2, 1924.
R. F. McKENZIE
RIM LOCK
Filed Feb. 28, 1923
1,507,508
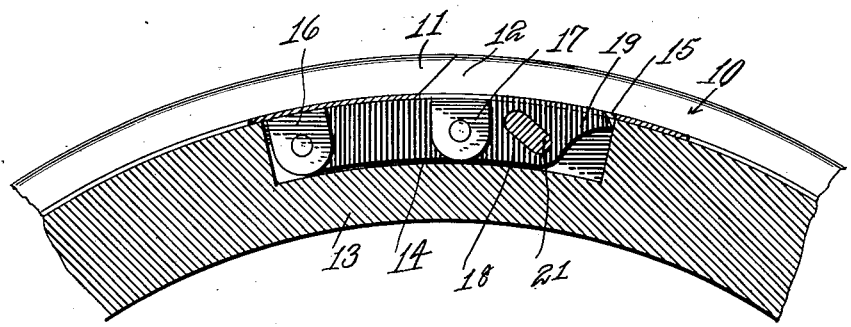
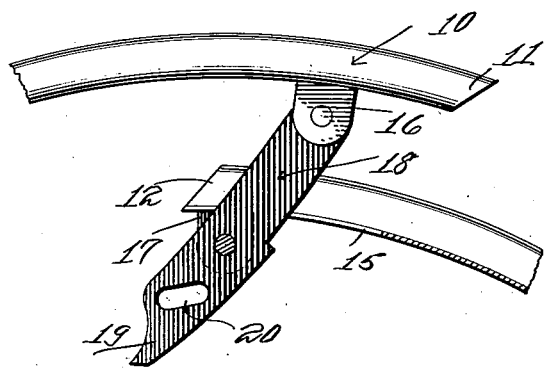
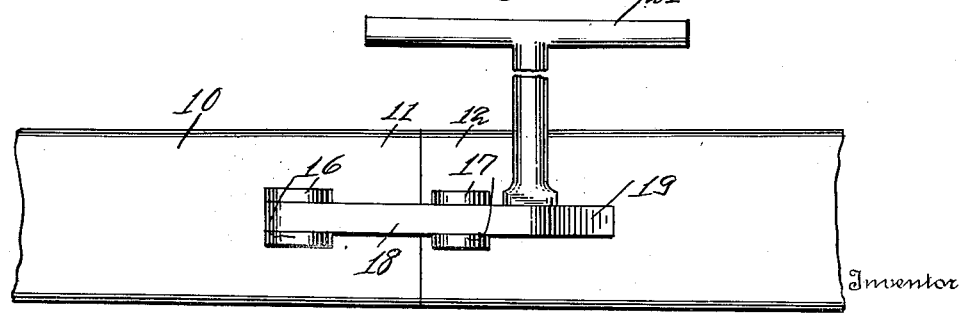
Inventor
Robert F. McKenzie
By
Attorney Patented Sept. 2, 1924.

1,507,508

UNITED STATES PATENT OFFICE.

ROBERT F. McKENZIE, OF SCOTTSVILLE, KENTUCKY, ASSIGNOR OF ONE-FOURTH TO GILBERT G. WILSON, OF SCOTTSVILLE, KENTUCKY.

RIM LOCK.

Application filed February 28, 1923. Serial No. 621,802.

*To all whom it may concern:*

Be it known that I, ROBERT F. MCKENZIE, a citizen of the United States, residing at Scottsville, in the county of Allen, State of Kentucky, have invented certain new and useful Improvements in Rim Locks; and I do hereby declare the following to be a full, clear, and exact description of the invention, such as will enable others skilled in the art to which it appertains to make and use the same.

This invention relates to new and useful improvements in rims and particularly to demountable rims for automobile wheels, of the split ring type.

One object of the invention is to provide means for easily and quickly opening or closing the split rim, and without danger to the operator, or injury to the rim.

Another object is to provide a device of this character which is adapted to be operated by a key for the purpose of springing the split of the rim into open or closed position, without the use of hammers, screwdrivers, or other tools which tend to injure the rim.

A further object is to simplify and cheapen the construction of the device over my prior patent issued November 7, 1922, #1,434,786, for rim expanders and contractors.

Other objects and advantages will be apparent from the following description when taken in connection with the accompanying drawing.

In the drawing:

Figure 1 is a side elevation of a rim equipped with the opening and closing link, the rim being shown in closed position, and the felly shown in section.

Figure 2 is a side elevation of the same showing the rim in open position, one end of the rim being partly in section.

Figure 3 is a plan view, looking toward the inner face of the split of the rim, the rim being closed.

Referring particularly to the accompanying drawing there is shown a portion of a split rim 10 having the abutting ends 11 and 12, said rim being disposed on the felly 13. The felly has a recess 14 formed in its peripheral face, and extending from one side of the felly partly across the face thereof. The end 12, of the rim, is formed with a longitudinal angular recess 15, opening through the end face thereof, and secured to, or integrally formed on the inner faces of the ends of the rim are the parallel pairs of inwardly directed lugs 16 and 17, the same being adapted to pass into the recess 15, when the rim is slipped onto the felly. Extending longitudinally across the split of the rim, and being pivotally connected to and arranged between the pairs of lugs 16 and 17, is the closing and opening link 18.

It will be noted that the link 18 has a projection 19 which extends beyond the lugs 17, and is arranged to lie within and close the recess 15, when the rim ends engage.

It will also be noted that the link is longitudinally curved, to conform to the contour of the inner face of the rim and has its outer curved face disposed against the inner face of the rim across the split.

In the projection 19 there is formed an obliquely arranged elongated opening 20 for the reception of the correspondingly shaped end of a key 21, which key is shown in section within the opening, in Figure 1. Thus, by inserting the key in the opening, and turning the key, the link will be so moved as to cause the ends of the rim to be sprung away from each other and then past each other, whereby the diameter is reduced and the tire easily removed therefrom. A reverse movement of key causes the reengagement of the ends of the rim.

What is claimed is:

A demountable rim comprising a split ring having a recess in one end, an opening and closing link pivotally connected to the ends of the ring, and a tongue extending from one end of the link beyond the pivot thereof for closing the recess when the ring ends engage, said tongue being formed with a key receiving opening extending obliquely and transversely thereof.

In testimony whereof, I affix my signature, in the presence of two witnesses.

ROBERT F. McKENZIE.

Witnesses:
T. A. WALKER,
J. A. DUNN.